May 7, 1929.  M. O. RIFE ET AL  1,712,400
TUBING DRAINER
Filed Sept. 14, 1928   2 Sheets-Sheet 1
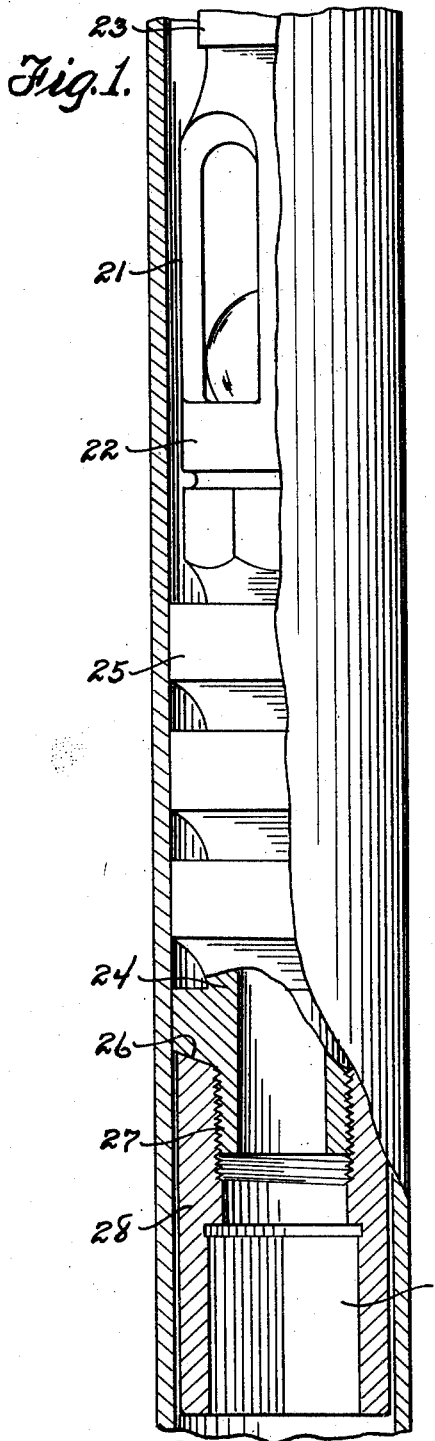
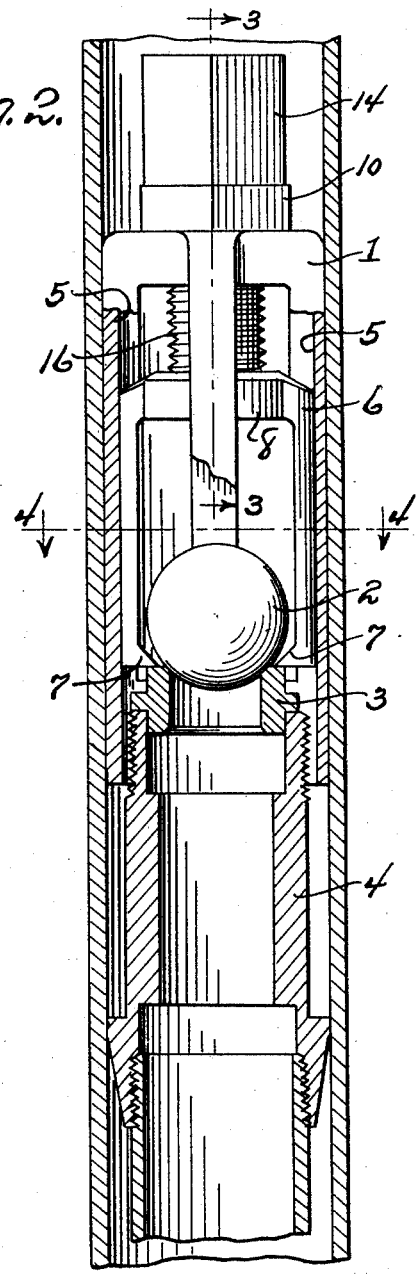
Mervin O. Rife and
William P. Capps
INVENTORS

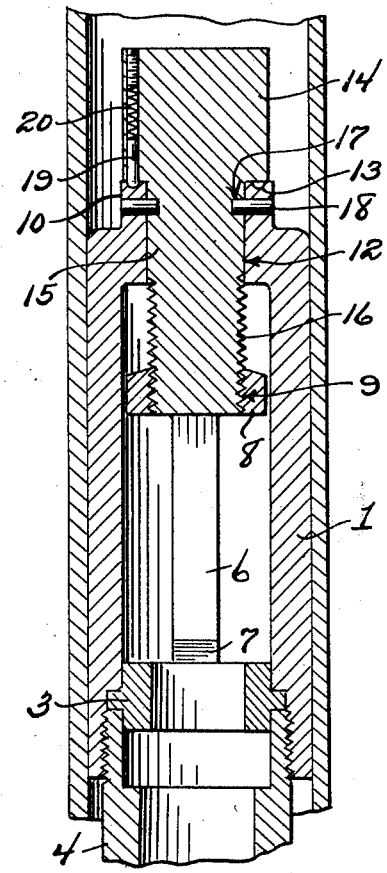
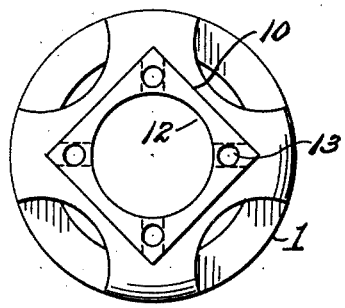
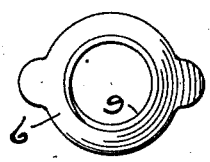
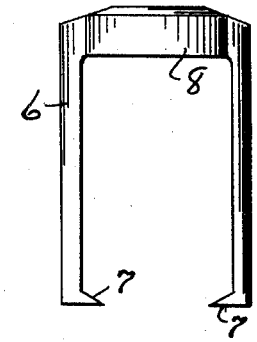
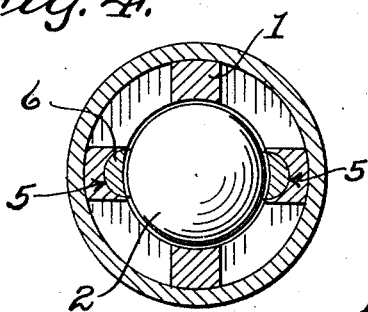

Patented May 7, 1929.

1,712,400

UNITED STATES PATENT OFFICE.

MERVIN O. RIFE AND WILLIAM P. CAPPS, OF SHREVEPORT, LOUISIANA.

TUBING DRAINER.

Application filed September 14, 1928. Serial No. 306,091.

The present invention has reference to oil pumps and has for its primary object the provision of means for attaching the plunger to the sucker rod, should the same be disconnected, which is frequent in the operation of this type of pumps and also to provide means whereby the standing valve may be unseated by the simple turning of the sucker rod when it is desired to drain the tubing while changing the working barrel, tubing or standing valve.

An important object of the invention is the provision of a strong and efficient tubing drainer which shall be simple in construction and manufactured at a low cost.

Another object is the provision of a device for this purpose which shall be an improvement upon U. S. Patent No. 1,613,559, granted Jan. 4, 1927.

To the attainment of the foregoing the invention consists in the improvement hereinafter described and definitely claimed.

In the drawings:

Figure 1 is a side elevation, with parts in section of the upper portion of the improvement.

Figure 2 is a central longitudinal sectional view of the lower portion of the improvement.

Figure 3 is a sectional view approximately on the line 3—3 of Figure 2.

Figure 4 is a transverse sectional view approximately on the line 4—4 of Figure 2.

Figure 5 is a top plan view of the standing valve cage.

Figure 6 is a top plan view of the yoke.

Figure 7 is a side elevation of the yoke.

The cage 1 of the standing valve, except for details which will be referred to, is of the ordinary construction. The cage has arranged therein a ball valve 2 that occupies a seat 3 and there is screwed in the lower end of the cage a tubular extension 4 which holds the seat in place.

The cage 1 preferably has two of its opposite or ribbed sides formed with longitudinally extending grooves 5 whose walls are rounded and which serve as guide grooves for the rounded arms of the yoke 6. The lower ends of the arms of the yoke are formed with angularly disposed inwardly directed fingers 7 that underlie the ball valve 2. The connecting element for the arms of the yoke, is for distinction indicated by the numeral 8, and has a central threaded opening 9 therethrough.

The top 10 of the cage is square in plan and is provided with a central round and non-threaded opening 12. The top 10 on the outer face thereof has rightangularly arranged depressions 13, the purpose of which will presently be apparent.

Resting on the squared top 10 of the cage 1 there is the headed and squared end 14 of a plug 15. The lower and reduced end of the plug is threaded, as at 16, and these threads are screwed through the threaded opening 9 of the yoke 6. The shank is, of course, round in cross section and has its non-threaded portion passing through the opening 12 in the head 10. The shank is formed with an annular groove 17, and passing through the sides of the head 10 and the cage 1 there are pins 18 that are received in the said grooves. In this manner it will be noted that the plug is revolubly associated with the cage and likewise in this manner it will be noted that the turning of the plug will impart a longitudinal movement to the yoke 6 to cause the fingers thereof which engage with the ball valve to move the same away from its seat 3, so that the upper portion of the pump may be drained when desired.

The head 14 is provided with a longitudinally extending normally plugged passage for the reception of a pin or detent 19 that is influenced by a spring 20, the said pin having an outer rounded end adapted to be received in any of the notches 13 in the headed end 10 of the cage 1. By this arrangement it will be seen that the plug is prevented from accidental turning on the cage.

Above and, of course, normally out of contact with the standing valve and the cage therefor, there is the cage 21 for the working barrel 22 of the pump. There is screwed on the upper end of the cage 21 the socket end of the sucker rod 23 and depending from the cage there is the usual tubular extension 24 that carries the sucker cups 25. The lower end of the plunger barrel has a reduced end and an annular shoulder 26 at the juncture of said end. The reduced end is indicated by the numeral 27 and is exteriorly threaded. Screwed on the threaded end 27 and contacting with the shoulder 26 there is a socket member 28. The socket 29 in the member 28 is of a length approximately equaling that of the head 14 of the plug associated with the standing valve.

Should the sucker rod become disconnected from the cage 21 the said cage will gravitate so that its socket will engage with the head 14 of plug and the square portion 10 on the cage and thus be held from turning by reason of the squared portion 10 being made on end of cage 1. It is merely necessary to lower the sucker rods and screw the same again on cage 21.

When it is desired to drain the tubing sucker rods and cage are lowered so that the socket will engage with the head of the plug only, and not enough to engage square 10 on cage. A wrench or similar element is employed for turning the sucker rod, which, of course, will impart a like turning to the socket and the plug and by virtue of the turning of the plug an upward longitudinal movement will be imparted to the yoke 26 and to the ball valve of the standing cage so that all oil in the tubing will drain back into the well. In this manner it will be noted that the usual waste incident to the changing of the working barrel, the tubing and standing valve, etc., will be entirely saved. It is further to be noted that the spring influenced pin engaging the notches 13 serve to hold the ball valve in the lower or standing cage securely closed when the pump is in operation.

It is thought that the foregoing description when read in connection with the accompanying drawings will fully set forth the simplicity and advantages of our improvement but necessarily the same is not to be restricted to the precise details herein set forth as such changes may be made therefrom as fairly fall within the scope of the appended claim.

Having described the invention, we claim:

An oil well pump including a standing valve and a working valve, a cage for both of the valves, and the cage of the standing valve having a squared extension, a yoke guided for longitudinal movement in the cage of the standing valve and having its ends formed with fingers engageable with the valve in said cage, a plug revolubly mounted on the top of said cage, spring influenced means between the plug and cage for holding the plug from free turning on the cage, means for preventing the longitudinal movement of the plug through the cage, said plug having a threaded engagement with the top of the yoke, a sucker rod screwed on the top of the working valve, a plunger on the bottom of the working valve and a socket member removably secured to the lower end of the sucker rod and engageable with the head of the plug and the squared portion of the standing valve when the working valve is lowered.

In testimony whereof we affix our signatures.

MERVIN O. RIFE.
WILLIAM P. CAPPS.